US010695630B2

(12) United States Patent
Ferguson et al.

(10) Patent No.: US 10,695,630 B2
(45) Date of Patent: Jun. 30, 2020

(54) ACCESSORY HOLDER

(71) Applicant: Kover Keeper LLC, Broomfield, CO (US)

(72) Inventors: Daniel W. Ferguson, Broomfield, CO (US); Paul McQuade, Broomfield, CO (US)

(73) Assignee: Kover Keeper LLC, Broomfield, CO (US)

( * ) Notice: Subject to any disclaimer, the term of this patent is extended or adjusted under 35 U.S.C. 154(b) by 0 days.

(21) Appl. No.: 16/253,885

(22) Filed: Jan. 22, 2019

(65) Prior Publication Data
US 2019/0232133 A1 Aug. 1, 2019

Related U.S. Application Data

(60) Provisional application No. 62/623,883, filed on Jan. 30, 2018.

(51) Int. Cl.
*A63B 57/20* (2015.01)
*F16M 13/02* (2006.01)
*A63B 55/00* (2015.01)
*F16B 2/22* (2006.01)
*F16B 2/10* (2006.01)
*A63B 60/62* (2015.01)

(52) U.S. Cl.
CPC ............ *A63B 57/20* (2015.10); *A63B 55/406* (2015.10); *A63B 55/408* (2015.10); *F16M 13/02* (2013.01); *A63B 60/62* (2015.10); *F16B 2/10* (2013.01); *F16B 2/22* (2013.01)

(58) Field of Classification Search
CPC ...... A45F 5/02; A45F 5/021; A45F 2005/006; Y10T 24/1391; Y10T 24/1397; F16M 13/02; A63B 57/20; A63B 55/406; A63B 55/408; A63B 60/32; F16B 2/10; F16B 2/22
See application file for complete search history.

(56) References Cited

U.S. PATENT DOCUMENTS

| 6,434,800 | B1* | 8/2002 | James | A63B 60/62 |
| | | | | 24/298 |
| 6,530,131 | B1* | 3/2003 | Hopkins | A45F 5/00 |
| | | | | 24/3.13 |
| 9,392,864 | B2* | 7/2016 | Reed | A45F 5/021 |
| 2008/0134474 | A1* | 6/2008 | Uryasov | A45F 5/02 |
| | | | | 24/303 |

OTHER PUBLICATIONS

Co-owned U.S. Appl. No. 29/677,567, filed Jan. 22, 2019.

* cited by examiner

*Primary Examiner* — Corey N Skurdal
(74) *Attorney, Agent, or Firm* — Trenner Law Firm, LLC; Mark D. Trenner

(57) ABSTRACT

An example accessory holder includes a first clip member, a second clip member, and a third clip member. The second clip member is pivotally connected to the first clip member. Each of the clip members are biased in a closed position, and each of the clip members have teeth. The first clip member has a substantially U-shaped body formed by a single member having a first end meeting a second end. An attachment opening is formed through the second clip member. A coil line is connected on one end to the attachment portion of the second clip member. The coil line is connected on another end to the third clip member.

20 Claims, 6 Drawing Sheets

ACCESSORY HOLDER

CROSS REFERENCE TO RELATED APPLICATIONS

This application claims the priority benefit of U.S. Provisional Patent Application No. 62/623,883 filed Jan. 30, 2018 for "Golf Head Cover Holder" of Daniel W. Ferguson, hereby incorporated by reference in its entirety as though fully set forth herein.

BACKGROUND

There are many accessories for the sport of golf. These accessories can be misplaced during play. For example, a golfer may take a golf head cover off the golf club for play, and then leave it sitting on a bench or elsewhere on the golf course. By the time the golfer realizes it is missing, it may be several holes back. The golfer either has to retrace his or her path to find it, or leave it behind and purchase another.

DETAILED DESCRIPTION

An accessory holder is disclosed which may be provided for keeping a golf head cover and/or other accessory together with a golf bag. In an example, the accessory holder may include plastic clips that may be attached to a golf bag or other object or structure to keep accessories such as, but not limited to, golf head covers, a range finder, and/or other accessories together for a game of golf.

An example of the accessory holder includes a first clip member, a second clip member, and a third clip member. The second clip member is pivotally connected to the first clip member. Each of the clip members are biased in a closed position, and each of the clip members have teeth. The first clip member has a substantially U-shaped body formed by a single member having a first end meeting a second end. An attachment opening is formed through the second clip member. A coil line is connected on one end to the attachment portion of the second clip member. The coil line is connected on another end to the third clip member. In an example, the attachment line is connected to the attachment opening via a first ring, and the third clip member is connected to the attachment line via a second ring.

Before continuing, it is noted that as used herein, the terms "includes" and "including" mean, but is not limited to, "includes" or "including" and "includes at least" or "including at least." The term "based on" means "based on" and "based at least in part on."

Figure 1:
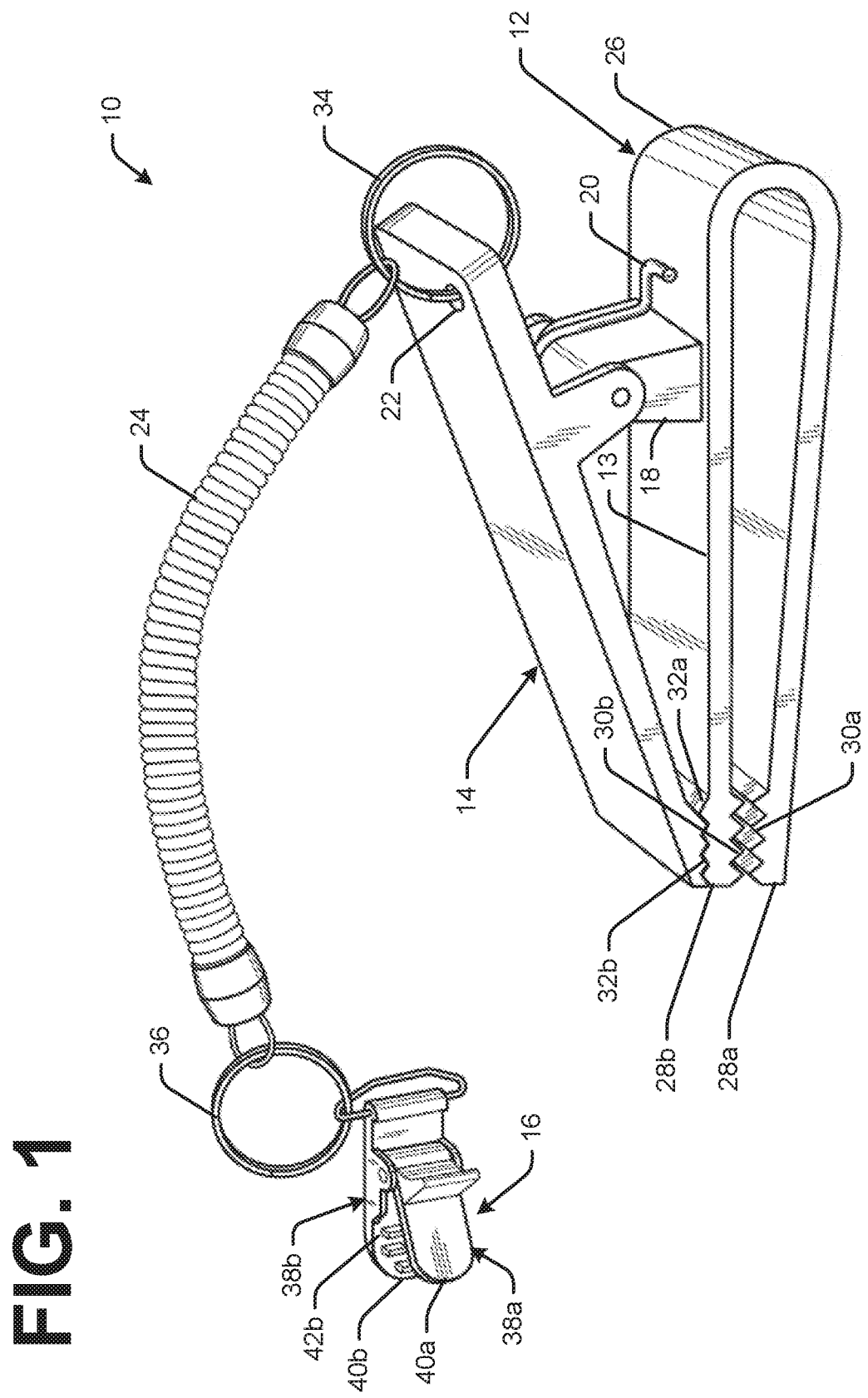
FIG. 1 is a top perspective view of an example accessory holder.
Figure 2:
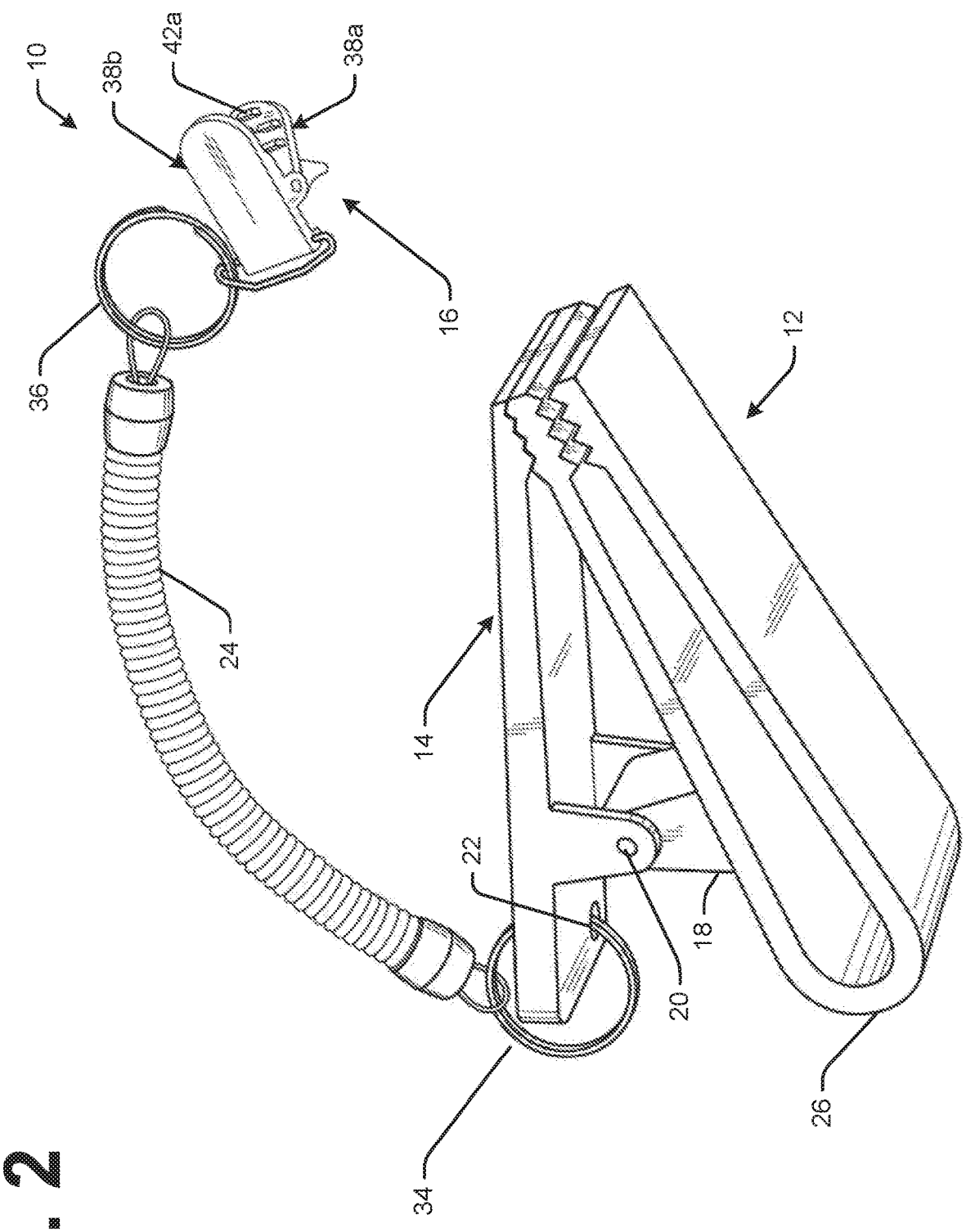
FIG. 2 is a bottom perspective view of the example accessory holder.
Figure 3:
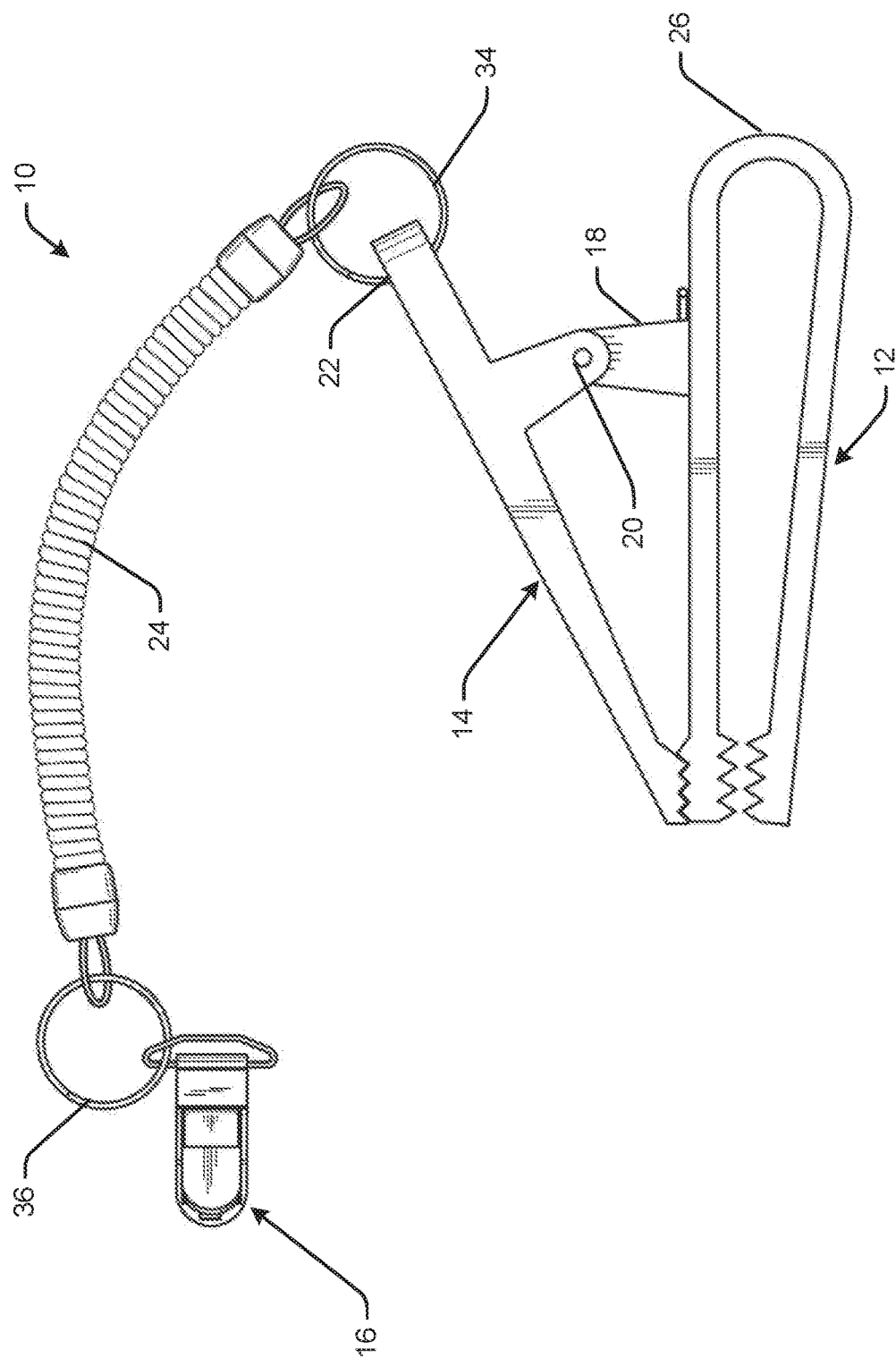
FIG. 3 is a right side view of the example accessory holder.
Figure 4:
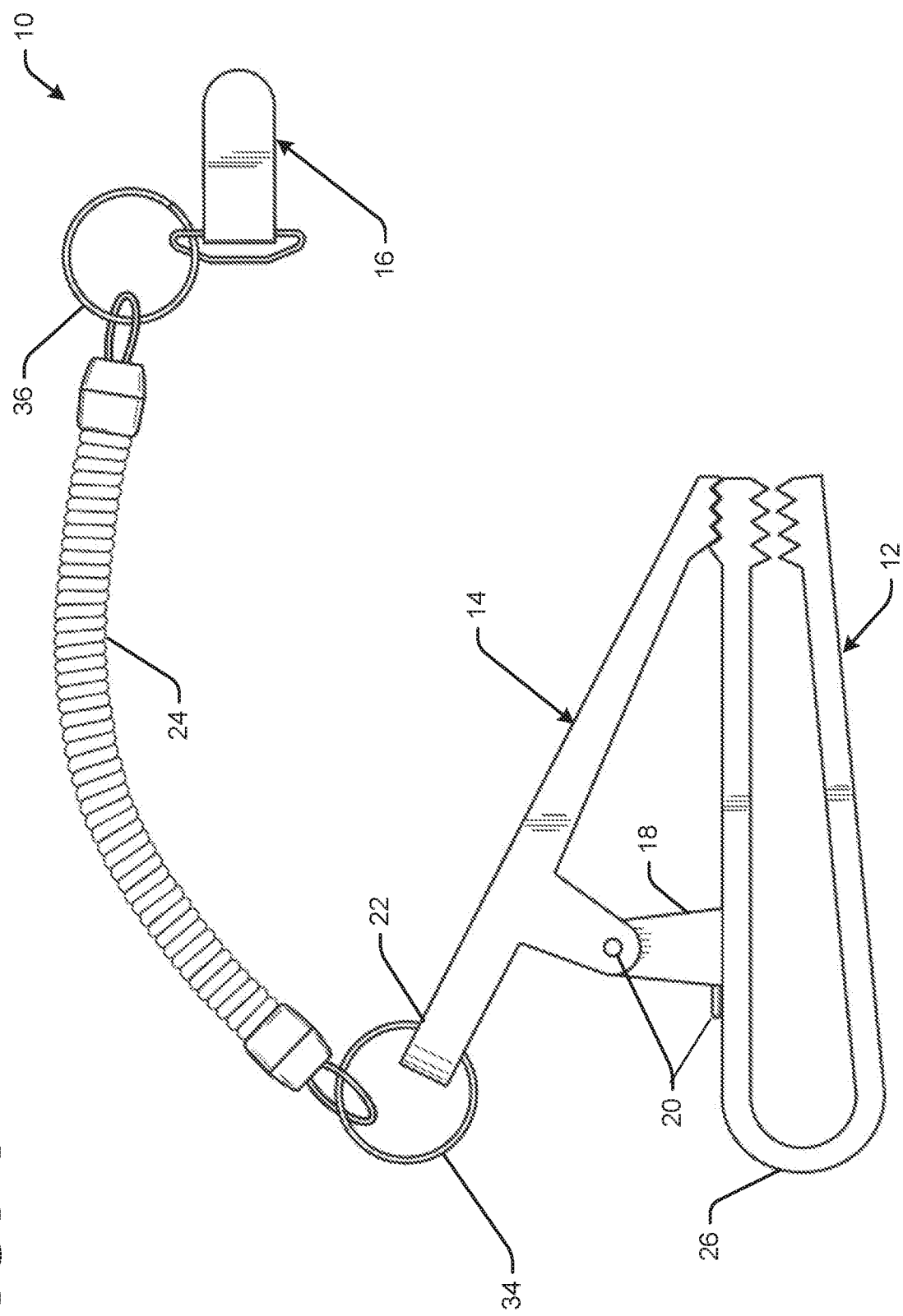
FIG. 4 is a left side view of the example accessory holder.
Figure 5:
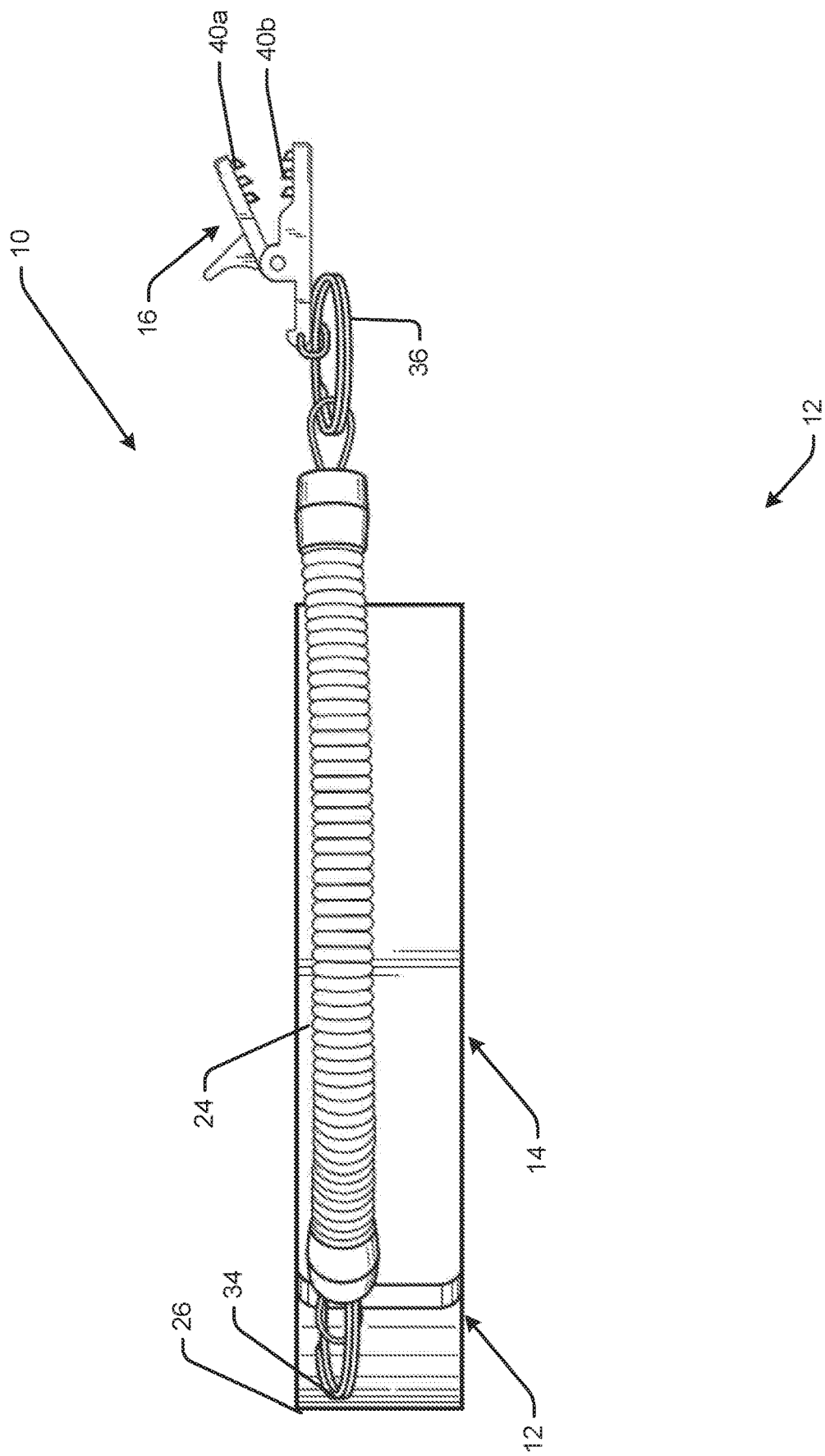
FIG. 5 is a top view of the example accessory holder.

FIG. 1 is a top perspective view of an example accessory holder 10. FIG. 2 is a bottom perspective view of the example accessory holder 10. FIG. 3 is a right side view of the example accessory holder 10. FIG. 4 is a left side view of the example accessory holder 10. FIG. 5 is a top view of the example accessory holder 10.

An example accessory holder 10 includes a first clip member 12, a second clip member, 14, and a third clip member 16. The second clip member 14 is formed as a part of the first clip member 12. That is the first and second clip members form a single part of the overall device.

In an example, the first clip member 12 has a spring bar 18. A spring member 20 is provided to pivotally connect the second clip member 14 to the first clip member 12 via the spring bar 18. The spring member 20 hinges or pivotally connects the spring bar 18 to the second clip member 14 to bias the second clip member 14 against an arm 13 of the first clip member when the second clip member 14 is in a closed position.

The second clip member 14 may include an attachment portion 22. In an example, the attachment portion is an opening or a hole through one end of the second clip member 14. However, other attachments may also be provided. In an example, an attachment line 24 is connected on one end to the attachment portion 22 of the second clip member 14. The attachment line is connected on another end to the third clip member 16.

In an example, the attachment line 24 is a coil line. However, it is noted that the attachment line 24 need not be a coil. Other attachment links are also contemplated, such as but not limited to, a cord. The attachment line 24 may be connected via the attachment portion on the second clip member 14. For example, the attachment portion may be the opening 22 formed in the second clip member 14. In an example, the attachment line 24 is connected to the opening 22 formed in the second clip 14 member via a first ring 34. The third clip member 16 is connected to the attachment line 24 via a second ring 36. However, rings are not necessary, and the third clip 16 may be attached in other manners (e.g., tied to the attachment line 24).

In an example, the first clip member 12 is defined by a body 26. The body 26 may be a substantially U-shaped member, e.g., as shown in FIG. 1. The body 26 is formed by a single member having a first end 28a and a second end 28b. The first end 28a of the body 26 is biased toward the second end 28b of the body 26 by default, in the closed position. As such, the first end 28a of the body 26 meets or "pinches" together with the second end 28b of the body 26. The body 26 of the first clip member 12 is thus biased in a closed position.

The first end 28a of the body 26 can be separated from the second end 28a of the body against the bias to open the first clip member 12. In an example, the first clip member 12 can be opened by pulling apart or sliding the clip 12 over the edge of a golf bag or other structure, to spread the first end 28a from the second end 28b. As such, the first clip member 12 can be attached to the golf bag or other structure structure and/or to retain an item by the first clip member 12, that is between the first end 28a and the second end 28b of the first clip member 12.

In an example, the first end 28a of the body 26 has teeth 30a. The second end 28b of the body 26 may also have teeth 30b. The teeth 30a and 30b engage in the closed position and provide a frictional engagement. The frictional engagement may be to the structure that the first clip 12 is attached to, or the item positioned to be held by the first clip 12.

In an example, the arm 13 of the first clip member 12 has teeth on both sides of the second end 28b. One set of teeth 30b engage with the teeth 30a on the other arm of the first clip member 12. The other set of teeth 32a engage with teeth 32b on the second clip member 14 in the closed position.

The teeth 32a and 32b may aid in providing a frictional engagement of the second clip 14 (e.g., to the structure that the second clip 14 is attached to, or the item positioned to be held by the second clip 14.

In an example, the third clip member 16 has a first arm 38a and a second arm 38b. A first end 40a of the first arm 38a and a first end 40b of the second arm 38b are biased toward one another in a closed position.

In an example, the first end 40a of the first arm 38a has teeth 42a that engage with teeth 42b on the first end 38b of the second arm 40b when the third clip member 16 is in a closed position. The teeth may aid in providing a frictional engagement of the third clip member 16 (e.g., to the structure that the third clip member 16 is attached to, or the item positioned to be held by the third clip 16.

It is noted that the examples described herein are provided for purposes of illustration, and are not intended to be limiting. Other devices and/or device configurations may be utilized to carry out the operations described herein. The operations shown and described herein are provided to illustrate example implementations. It is noted that the operations are not limited to the ordering shown. Still other operations may also be implemented.

Figure 6:
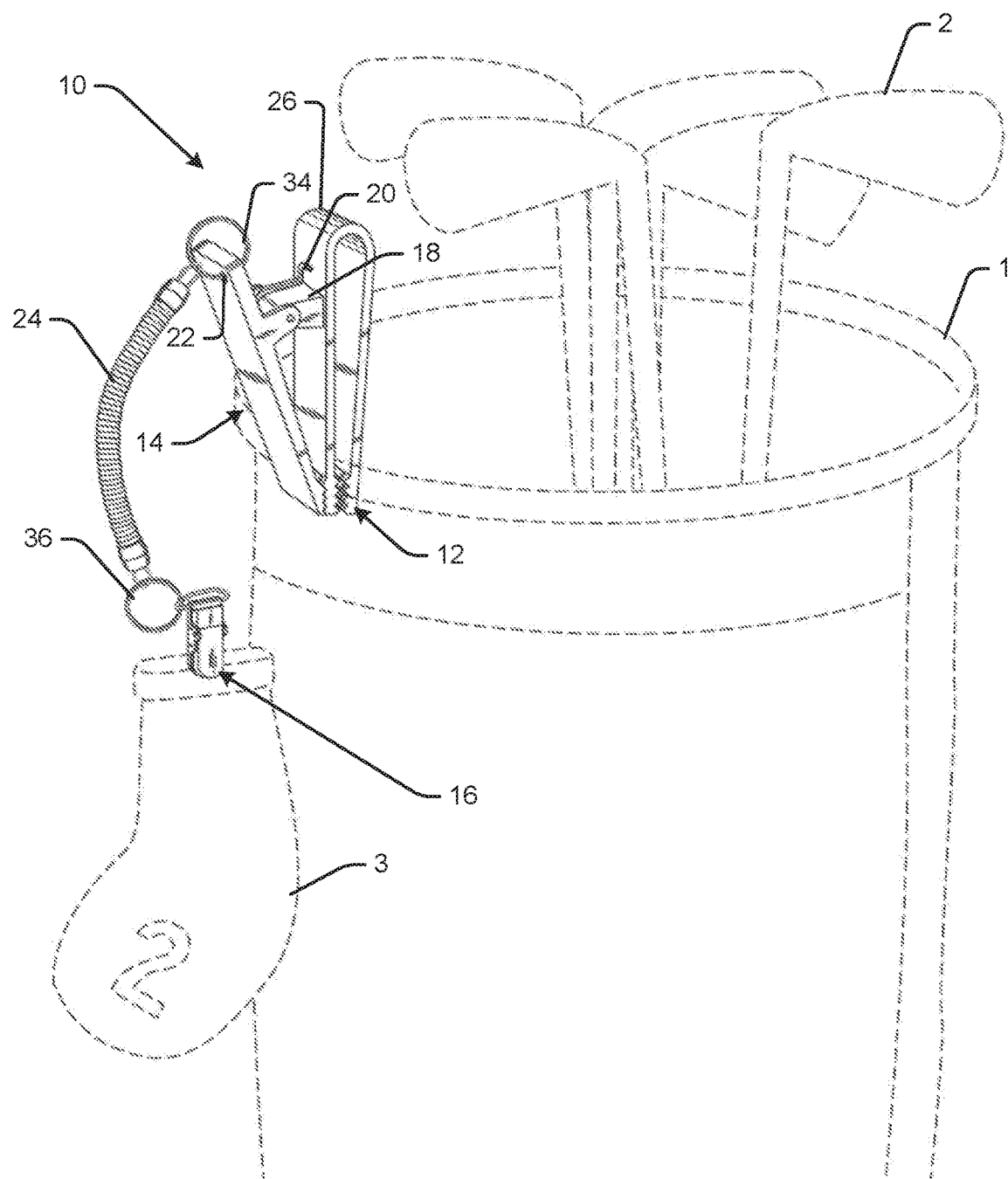
FIG. 6 is a perspective view of the example accessory holder as it may be used to connect a golf club head cover to a golf bag.

In an example, the accessory holder 10 is for connecting a golf head cover and/or other accessory to a golf club bag. FIG. 6 is a perspective view of the example accessory holder 10 as it may be used to connect a golf club 2 head cover 3 to a golf bag 1. The example accessory holder 10 includes a substantially U-shaped body and a clip portion.

In an example, the clip portion is hinged to the U-shaped body. The clip portion is spring biased in a closed position. The clip portion can be opened to operate the clip. One or more ridges may be formed in the U-shaped body to frictionally engage with the golf club 2 head cover 3, a towel, and/or other accessory, and retain it therein.

In an example, an attachment on the U-shaped body may be provided for connecting an attachment line 24. The attachment on the U-shaped body 26 may be a hole or an opening 22 formed in the U-shaped body 26 for connecting the attachment line 24. The attachment line 24 can be connected to the opening 22 formed in the U-shaped body 26 via a keyring 34 or other connection. The attachment line 24 may be a coil line or any other suitable line.

In an example, the accessory holder 10 may be provided for keeping a golf club head cover 3 and/or other accessory together with a golf bag 1, e.g., via any of the clips 12, 14, and/or 16. That is, the accessory holder 10 may include three plastic clips 12, 14, and 16, and any of these may be attached to the edge of the golf bag 1 or other object or structure (e.g., a golf cart, etc.), and to one or more accessory (e.g., the club head cover 3). As such, the accessory holder 10 may help to keep accessories such as, but not limited to, golf head covers 3, a range finder, and/or other accessories together for a game of golf.

In use, the example accessory holder 10 can help golfers keep from losing accessories by attaching their accessories to a golf bag 1 or elsewhere (e.g., a golf cart) that the accessories can be readily located and not left behind. However, the accessory holder 10 is not limited to any particular end-use, and may be provided for any of a variety of different end-uses related to the golf industry and/or other unrelated purposes. Other end-uses are also contemplated and will become readily apparent to those having ordinary skill in the art upon understanding the disclosure herein.

It is noted that the examples shown and described are provided for purposes of illustration and are not intended to be limiting. Still other examples are also contemplated.

The invention claimed is:

1. An accessory holder, comprising:
a first clip member having a first arm with a first set of teeth on one side and a second set of teeth on an opposite side, and a second arm with a third set of teeth;
a second clip member having a fourth set of teeth;
wherein the first set of teeth on the first arm engage with the third set of teeth on the second arm, and the second set of teeth on the first arm engage with the fourth set of teeth on the second clip member, the first and second set of teeth providing a frictional engagement of the first clip member to a structure that the first clip member is attached to, and the third and fourth set of teeth providing a frictional engagement to an item positioned to be held by the second clip member;
a third clip member;
a spring bar on the first clip member, the second clip member pivotally connected to the first clip member on the spring bar;
an attachment portion on the second clip member; and
an attachment line connected on one end to the attachment portion of the second clip member, the attachment line connected on another end to the third clip member.

2. The accessory holder of claim 1, wherein a body of the first clip member is biased in a closed position.

3. The accessory holder of claim 2, wherein the body of the first clip member is a substantially U-shaped member.

4. The accessory holder of claim 2, wherein the body is formed by a single member having a first end and a second end, the first end of the body meeting the second end of the body.

5. The accessory holder of claim 4, wherein the first end of the body is biased toward the second end of the body in the closed position.

6. The accessory holder of claim 4, wherein the first end of the body is separated from the second end of the body against the bias to open the first clip member for fastening on a structure.

7. The accessory holder of claim 1, further comprising a spring member pivotally connecting the spring bar to the second clip member to bias the second clip member against an arm of the first clip member when the second clip member is in a closed position.

8. The accessory holder of claim 1, wherein the attachment portion on the second clip member is an opening formed in the second clip member for connecting the attachment line.

9. The accessory holder of claim 8, wherein the attachment line is connected to the opening formed in the second clip member via a first ring.

10. The accessory holder of claim 9, wherein the third clip member is connected to the attachment line via a second ring.

11. The accessory holder of claim 1, wherein the first set of teeth and the second set of teeth are on a first end of the first clip member.

12. The accessory holder of claim 11; wherein the third set of teeth are on the first end of the first clip member, and the fourth set of teeth are at same end on the second clip member.

13. An accessory holder, comprising:
a first clip member having a first arm with a first set of teeth on one side and a second set of teeth on an opposite side, and a second arm with a third set of teeth;
a second clip member having a fourth set of teeth;
wherein the first set of teeth on the first arm engage with the third set of teeth on the second arm, and the second set of teeth on the first arm engage with the fourth set of teeth on the second dip member, the first and second set of teeth providing a frictional engagement of the first clip member to a structure that the first clip member is attached to, and the third and fourth set of teeth providing a frictional engagement to an item positioned to be held by the second clip member;

a third clip member;

wherein the second clip member is pivotally connected to the first clip member, and wherein each of the first clip member, the second clip member, and the third clip member are biased in a closed position;

a substantially U-shaped body of the first clip member, the body formed by a single member having a first end meeting a second end;

an attachment opening formed through the second clip member; and an attachment line connected on one end to the attachment portion of the second clip member, the attachment line connected on another end to the third clip member.

14. The accessory holder of claim 13, wherein the attachment line is connected to the attachment opening via a first ring, and the third clip member is connected to the attachment line via a second ring.

15. The accessory holder of claim 13, wherein the first set of teeth and the second set of teeth are on a first end of the first clip member.

16. The accessory holder of claim 15, wherein the third set of teeth are on the first end of the first clip member, and the fourth set of teeth are at same end on the second clip member.

17. An accessory holder, comprising:

a first clip member having a first arm with a first set of teeth on one side and a second set of teeth on an opposite side, and a second arm with a third set of teeth;

a second clip member having a fourth set of teeth;

wherein the first set of teeth on the first arm engage with the third set of teeth on the second arm, and the second set of teeth on the first arm engage with the fourth set of teeth on the second dip member, the first and second set of teeth providing a frictional engagement of the first clip member to a structure that the first clip member is attached to, and the third and fourth set of teeth providing a frictional engagement to an item positioned to be held by the second clip member;

a third clip member;

wherein the second clip member is pivotally connected to the first clip member, and wherein each of the first clip member, the second clip member, and the third clip member are biased in a closed position;

a substantially U-shaped body of the first clip member, the body formed by a single member having a first end meeting a second end;

an attachment opening formed through the second clip member; and a coil line connected on one end to the attachment portion of the second clip member, the coil line connected on another end to the third clip member.

18. The accessory holder of claim 17, wherein the attachment line is connected to the attachment opening via a first ring, and the third clip member is connected to the attachment line via a second ring.

19. The accessory holder of claim 17, wherein the first set of teeth and the second set of teeth are on a first end of the first clip member.

20. The accessory holder of claim 19, wherein the third set of teeth are on the first end of the first clip member, and the fourth set of teeth are at same end on the second clip member.

* * * * *